United States Patent
Stautner et al.

(10) Patent No.: US 8,992,094 B2
(45) Date of Patent: Mar. 31, 2015

(54) SUSPENSION STRUT BEARING

(71) Applicant: Schaeffler Technologies AG & Co. KG, Herzogenaurach (DE)

(72) Inventors: Ralf Stautner, Nuremberg (DE); Andreas Woellner, Nuremberg (DE); Rainer Lutz, Markt Erlbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/943,331

(22) Filed: Jul. 16, 2013

(65) Prior Publication Data

US 2014/0023307 A1    Jan. 23, 2014

(30) Foreign Application Priority Data

Jul. 18, 2012    (DE) .......................... 10 2012 212 521

(51) Int. Cl.
| F16C 19/10 | (2006.01) |
| F16C 33/58 | (2006.01) |
| F16C 33/76 | (2006.01) |
| F16C 35/04 | (2006.01) |

(52) U.S. Cl.
CPC ............. *F16C 33/583* (2013.01); *F16C 33/761* (2013.01); *F16C 2361/53* (2013.01); *F16C 19/10* (2013.01); *F16C 35/042* (2013.01)
USPC .......................................... 384/609; 384/615

(58) Field of Classification Search
CPC ............ B60G 15/068; B60G 2202/31; B60G 2204/418; B60G 2204/1242; F16C 19/10; F16C 19/16; F16C 19/163; F16C 33/76; F16C 33/80; F16C 33/761; F16C 2326/05
USPC .......................... 384/420, 590, 607, 609, 615
See application file for complete search history.

(56) References Cited

U.S. PATENT DOCUMENTS

| 2011/0262070 A1 | 10/2011 | Zernickel et al. |
| 2012/0020606 A1* | 1/2012 | Montboeuf et al. .......... 384/607 |

FOREIGN PATENT DOCUMENTS

| DE | 102010015712 A1 | 10/2011 |
| FR | 2 937 587 | 4/2010 |
| WO | WO 2011/076626 | 6/2011 |

* cited by examiner

*Primary Examiner* — Phillip A Johnson
(74) *Attorney, Agent, or Firm* — Davidson, Davidson & Kappel, LLC

(57) ABSTRACT

A suspension strut bearing including a guide ring arranged along a suspension strut axis, and a cap. The guide ring is configured for mounting a coil spring, and the cap is configured for supporting the suspension strut bearing on an undercarriage of an automotive vehicle. The guide ring includes a radial flange and further includes a guide nozzle adjoining the radial flange, the guide nozzle serving to guide said coil spring, the suspension strut bearing further including a thrust bearing arranged between the radial flange of the guide ring and the cap. The guide ring includes a reinforcement ring spray coated with a plastic, which reinforcement ring further includes a bushing section for reinforcing the guide nozzle and an integrally formed adjoining radial collar for reinforcing the radial flange, wherein the reinforcement ring is configured as a bearing part of the thrust bearing.

12 Claims, 1 Drawing Sheet

SUSPENSION STRUT BEARING

This claims the benefit of German Patent Application DE 10 2012 212 521.3, filed Jul. 18, 2012 and hereby incorporated by reference herein.

The present invention concerns a suspension strut bearing for an automotive vehicle. Suspension strut bearings can take up radial and axial forces. They permit the shock absorber spring to turn with low friction and free of faulty gripping during steering movements and spring deflection, so that the shock absorber spring operates without a righting moment.

BACKGROUND

DE 102010015712 A1 discloses a suspension strut bearing.

The above-mentioned suspension strut bearing comprises a guide ring made out of a plastic, which guide ring, on the one hand, supports and guides a coil spring that serves as a shock absorber spring and, on the other hand, is mounted with help of a deep groove thrust ball bearing for rotation relative to a chassis side cap, a bearing ring comprising a ball groove being arranged on a front end of the guide ring facing the cap. The guide ring comprises a reinforcing ring that is spray coated with the plastic.

SUMMARY OF THE INVENTION

It is an object of the present invention to provide a suspension strut bearing which suspension strut bearing possesses a simple structure.

The present invention provides a suspension strut bearing comprising a guide ring arranged along a suspension strut axis, and a cap, the guide ring being configured for mounting a coil spring and the cap being configured for supporting the suspension strut bearing on an undercarriage of the vehicle. The guide ring comprises a radial flange and a guide nozzle adjoining the radial flange. The guide nozzle serves to guide the coil spring. A thrust bearing is arranged between the radial flange of the guide ring and the cap. The guide ring comprises a reinforcement ring that is spray coated with a plastic, which reinforcement ring comprises a bushing section for reinforcing the guide nozzle and an integrally formed adjoining radial collar for reinforcing the radial flange. The fact that the reinforcement ring is configured as a bearing part of the thrust bearing results in several advantages: the number of separate parts is reduced, weight is saved and the axial design height along the axis of the suspension strut bearing is reduced. The last-mentioned advantage may be obtained from the fact that the reinforcement ring is configured as a bearing part, particularly as a thrust ball bearing ring, so that a wall thickness of one of the two components reinforcement ring and thrust ball bearing ring is omitted, and further omitted is an additional layer of plastic that is provided in the prior art suspension strut bearing between the reinforcement ring and the thrust ball bearing ring. In the region of the bearing part, no spray coating with plastic is required on the front end facing the cap.

The reinforcement ring made out of steel can be made by a shaping method out of sheet metal for example by a deep drawing method.

Preferably, the reinforcement ring comprises, on its front end facing the cap, an integrally formed ball groove serving as a raceway for balls of a deep groove thrust ball bearing. In this way, the transmission of axial and radial forces is enabled via the deep groove thrust ball bearing without the need of special measures for fixing a bearing washer because the reinforcement ring of the invention is coated with plastic, i.e. embedded in the plastic, so that the ball groove is perfectly positioned on the guide ring.

The bearing part and in particular the integrally formed ball groove is arranged outside of a region of the reinforcement ring sprayed over with the plastic, that is to say the ball groove is free of plastic in the region of the bearing raceway.

According to a further development of the invention, the thrust bearing can be a deep groove thrust ball bearing whose balls roll on ball grooves, while the ball groove associated to the guide ring is integrally formed on the radial collar of the reinforcement ring. Due to its shape, this guide ring is inherently rigid, while the reinforcement ring takes over the functions of a rolling bearing part as also of a component that enhances the rigidity.

In one variation that enhances the rigidity of the suspension strut bearing of the invention, a continuous shoulder is configured on the reinforcement ring about the suspension strut axis while being arranged between the bushing section and the radial collar. This ring-like closed shoulder imparts an improved rigidity to the reinforcement ring and thus also to the guide ring.

BRIEF DESCRIPTION OF THE DRAWINGS

The invention will now be described more closely with reference to an example of embodiment of the invention.

DETAILED DESCRIPTION

Figure 1:
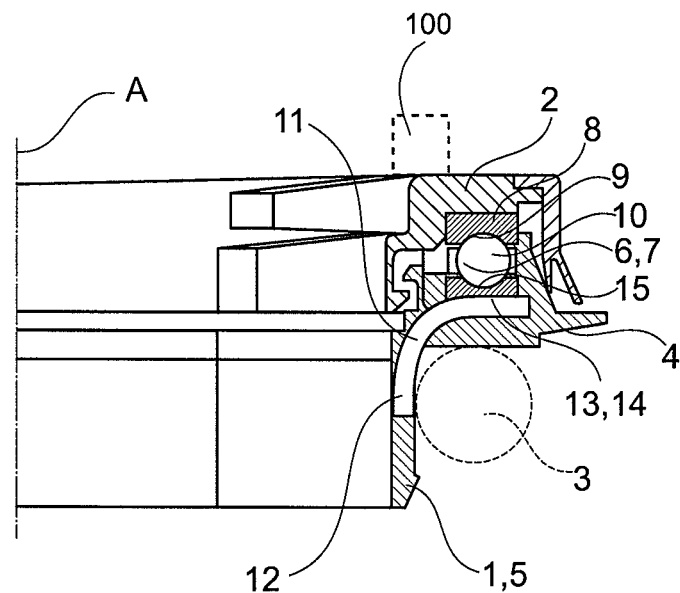
FIG. 1 shows a section through a first suspension strut bearing of the invention.

The suspension strut bearing of the invention illustrated in FIG. 1 comprises a guide ring 1 that is arranged along a suspension strut axis A, and a cap 2, the guide ring 1 being configured for mounting a coil spring 3, indicated merely with its wire cross-section, and the cap 2 being configured for supporting the suspension strut bearing on an undercarriage of a vehicle (shown solely schematically as 100).

The guide ring 1 comprises a radial flange 4 and a tubular guide nozzle 5 adjoining the inner periphery of the radial flange 4. The coil spring 3 is guided on the outer periphery of the guide nozzle 5 and axially supported on the radial flange 4, which radial flange 4 can be designated as a spring plate.

A thrust bearing 7 constituted by a deep groove thrust ball bearing 6 is arranged between the radial flange 4 of the guide ring 1 and the cap 2. The deep groove thrust ball bearing 6 comprises a bearing washer 8 that is arranged on the cap 2 and comprises, on its front end facing the guide ring 1, a ball groove 9. Balls 10 roll on the ball groove 9.

The guide ring 1 that is injection molded out of a plastic comprises a reinforcement ring 11 that is made out of steel and sprayed over with plastic, said reinforcement ring 11 comprising a bushing section 12 that reinforces the guide nozzle 5 and an integrally formed adjoining radial collar 13 that reinforces the radial flange 4.

With its radial collar 13, the reinforcement ring 11 forms a bearing part 14 of the thrust bearing 7 by the fact that an integrally formed adjoining ball groove 15 serving as a raceway for balls 10 of the deep groove thrust ball bearing 6 is integrally formed on the front end of the radial collar 13 facing the cap 2.

Figure 2:
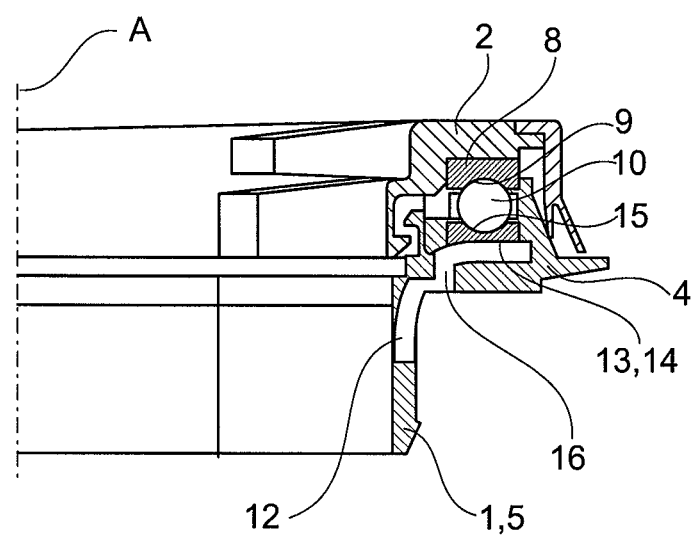
FIG. 2 shows a section through a second suspension strut bearing of the invention.

FIG. 2 shows a modified suspension strut bearing of the invention that differs from that of FIG. 1 only by the fact that a ring-like closed shoulder 16 extending around the suspension strut axis A is configured on the reinforcement ring 11 while being arranged between the bushing section 12 and the radial collar 13 of the reinforcement ring 11. This shoulder 16 is configured on one side integrally on the bushing section 12 and on the other side integrally on the radial collar 13. The shoulder 16 imparts an improved self-rigidity to the reinforcement ring.

It can be seen in both the figures that in the region of the ball groove 15, the reinforcement ring 11 of the guide ring 1 is free of plastic. The reinforcement ring 11 can be made economically out of steel by a shaping method.

What is claimed is:

1. A suspension strut bearing comprising:
   a guide ring arranged along a suspension strut axis and configured for mounting a coil spring, the guide ring including a radial flange and a guide nozzle adjoining the radial flange, the guide nozzle serving to guide the coil spring;
   a cap configured for supporting the suspension strut bearing on an undercarriage of an automotive vehicle; and
   a thrust bearing arranged between the radial flange of the guide ring and the cap;
   the guide ring including a reinforcement ring spray coated with a plastic, the reinforcement ring including a bushing section for reinforcing the guide nozzle and an integrally formed adjoining radial collar for reinforcing the radial flange, the bushing section extending axially away from the radial flange and into the guide nozzle along the coil spring, the reinforcement ring being configured as a bearing part of the thrust bearing,
   wherein the guide nozzle and the adjoining radial collar are injection molded out of plastic and the reinforcement ring is formed of metal and sprayed over with the plastic,
   wherein in a region of the bearing part of the reinforcement ring is not sprayed with plastic.

2. The suspension strut bearing as recited in claim 1 wherein the reinforcement ring includes, on a front end facing the cap, an integrally formed ball groove for balls of the thrust bearing, the thrust bearing being a deep groove thrust ball bearing.

3. The suspension strut bearing as recited in claim 1 wherein the thrust bearing is a deep groove ball bearing including balls rolling on ball grooves, one of the ball grooves associated to the guide ring being integrally formed on the radial collar of the reinforcement ring.

4. The suspension strut bearing as recited in claim 1 wherein the reinforcement ring includes a shoulder extending about the suspension strut axis, the shoulder being arranged between the bushing section and the radial collar.

5. The suspension strut bearing as recited in claim 4 wherein the shoulder includes a first portion extending parallel to the radial collar at a surface of the radial collar for supporting coil spring, the shoulder including a second portion perpendicular to the first portion.

6. A suspension strut bearing comprising:
   a guide ring arranged along a suspension strut axis and configured for mounting a coil spring, the guide ring including a radial flange and a guide nozzle adjoining the radial flange, the guide nozzle serving to guide the coil spring;
   a cap configured for supporting the suspension strut bearing on an undercarriage of an automotive vehicle; and
   a thrust bearing arranged between the radial flange of the guide ring and the cap;
   the guide ring including a reinforcement ring spray coated with a plastic, the reinforcement ring including a bushing section for reinforcing the guide nozzle and an integrally formed adjoining radial collar for reinforcing the radial flange, the bushing section extending axially away from the radial flange and into the guide nozzle along the coil spring, the reinforcement ring being configured as a bearing part of the thrust bearing,
   wherein the reinforcement ring includes a shoulder extending about the suspension strut axis, the shoulder being arranged between the bushing section and the radial collar,
   wherein the shoulder includes a first portion extending parallel to the radial collar at a surface of the radial collar for supporting coil spring, the shoulder including a second portion perpendicular to the first portion.

7. The suspension strut bearing as recited in claim 6 wherein the reinforcement ring is free of plastic in a region of the bearing part on a side facing the cap.

8. The suspension strut bearing as recited in claim 6 wherein the guide nozzle and the adjoining radial collar are injection molded out of plastic and the reinforcement ring is formed of metal and sprayed over with the plastic.

9. The suspension strut bearing as recited in claim 8 wherein in a region of the bearing part of the reinforcement ring is not sprayed with plastic.

10. The suspension strut bearing as recited in claim 6 wherein the reinforcement ring includes, on a front end facing the cap, an integrally formed ball groove for balls of the thrust bearing, the thrust bearing being a deep groove thrust ball bearing.

11. The suspension strut bearing as recited in claim 6 wherein the thrust bearing is a deep groove ball bearing including balls rolling on ball grooves, one of the ball grooves associated to the guide ring being integrally formed on the radial collar of the reinforcement ring.

12. The suspension strut bearing as recited in claim 6 wherein the reinforcement ring includes a shoulder extending about the suspension strut axis, the shoulder being arranged between the bushing section and the radial collar.

\* \* \* \* \*